(12) United States Patent
Cha et al.

(10) Patent No.: US 8,870,208 B2
(45) Date of Patent: Oct. 28, 2014

(54) SIDE-STEP DEVICE

(71) Applicant: Hyundai Motor Company, Seoul (KR)

(72) Inventors: Dong Eun Cha, Gyeonggi-do (KR);
Bock Cheol Lee, Gyeonggi-do (KR);
Seung Mok Lee, Gyeonggi-do (KR);
Phil Jung Jeong, Gyeonggi-do (KR);
Hyun Gyung Kim, Gyeonggi-do (KR);
Young Sub Oh, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/846,477

(22) Filed: Mar. 18, 2013

(65) Prior Publication Data
US 2014/0183835 A1 Jul. 3, 2014

(30) Foreign Application Priority Data

Dec. 28, 2012 (KR) .......................... 10-2012-0156284

(51) Int. Cl.
*B60R 3/00* (2006.01)
*B60R 3/02* (2006.01)
(52) U.S. Cl.
CPC ........................................ *B60R 3/02* (2013.01)
USPC ........... 280/166; 280/163; 280/169; 280/762; 280/763.1; 280/764.1; 280/765.1; 280/766.1
(58) Field of Classification Search
CPC combination set(s) only.
See application file for complete search history.

(56) References Cited

U.S. PATENT DOCUMENTS

| 7,367,574 B2* | 5/2008 | Leitner .......................... 280/166 |
| 7,900,944 B2* | 3/2011 | Watson .......................... 280/166 |
| 7,976,042 B2* | 7/2011 | Watson et al. ................. 280/166 |
| 2010/0230933 A1* | 9/2010 | Dean et al. ..................... 280/647 |

FOREIGN PATENT DOCUMENTS

JP    20-1993-061159    8/1993

* cited by examiner

Primary Examiner — J. Allen Shriver, II
Assistant Examiner — Hilary L Johns
(74) Attorney, Agent, or Firm — Edwards Wildman Palmer LLP; Peter F. Corless

(57) ABSTRACT

A side-step device that includes a driving unit, a pinion gear, a driving gear unit, and a step. The driving unit is mounted on a vehicle body, and the pinion gear is connected to the driving unit and is configured to rotate. The driving gear unit is composed of an outer gear surrounding a portion of the pinion gear and engaging with the pinion gear and a rack gear extending from one end of the outer gear to the vehicle body. The step connects to the opposite side of the vehicle body to the driving gear unit, folds in a normal state, unfolds out from the vehicle body when the pinion gear and the outer gear are interlocked, and extends out from the vehicle body from the unfolded state when the pinion gear and the rack gear interlock.

7 Claims, 3 Drawing Sheets

SIDE-STEP DEVICE

CROSS-REFERENCE TO RELATED APPLICATION

This application claims under 35 U.S.C. §119(a) the benefit of Korean Patent Application No. 10-2012-0156284 filed on Dec. 28, 2012, the entire contents of which are incorporated herein by reference.

BACKGROUND (a) Technical Field

The present invention relates to a side-step device that is mounted on a side of a vehicle to allow a user to conveniently get on/off the vehicle, and more particularly, to a side-step device with a step that maximize convenience for a user by folding in a normal state and unfolding and sliding when the user uses it.

(b) Background Art

In general, vehicles such as SUVs and vans are mounted with a side step that assists a passenger to get on the vehicles because the vehicle bodies of the vehicles are high. The side steps generally always protrude, fixed to the side seal panel of the vehicles, so they have an adverse influence on the external appearance and hit against people or objects. Further, since the side steps keep protruding, they interfere with the flow of air while the vehicles travel, therefore the performance is deteriorated and fuel efficiency is reduced.

In order to improve the defects of the existing steps fixed and protruding, a step has been introduced that is stored and drawn outward by rotating motion and sliding motion with power from a motor, but the height of the step is not adjustable, so they are hard for some consumers to reach. Additionally the space required to store these steps is quite large.

Therefore, it is required to develop a side-step device that can be used by all consumers with ease, that can provide sufficient space and width for a passenger to step on, and that has a new structure improving convenience for a user getting in or out of a vehicle.

The description provided above as a related art of the present invention is just for helping understanding the background of the present invention and should not be construed as being included in the related art known by those skilled in the art.

SUMMARY OF THE DISCLOSURE

The present invention has been made in an effort to provide a side-step device that can be used by all consumers with ease by adjusting the height, that can provide sufficient space and width for a passenger to step on while having a small storing space, and that has a new structure improving convenience for a user getting in or out of a vehicle.

In order to achieve the objects of the present invention, a side-step device includes: a driving unit mounted on a vehicle body; a pinion gear connected to the driving unit and configured to rotate; and a driving gear unit composed of an outer gear surrounding a portion of the pinion gear and engaging with the pinion gear and a rack gear extending from one end of the outer gear to the vehicle body. Also included is a step connected to the opposite side of the vehicle body to the driving gear unit. The step is folded in a normal state, and unfolded out from the vehicle body the pinion gear and the outer gear interlock, and extending out from the vehicle body from the unfolded state when the pinion gear and the rack gear interlock.

The pinion gear may be in mesh with the outer gear of the driving gear unit in a normal state so that the step may keep folded inside the vehicle body. The series of teeth of the outer gear and the rack gear of the driving gear unit may be continuously fitted so that the series of teeth may form a stick with the grip down.

The device may further include a cover having a housing with an arc-shape guide slot on the side, with a guide pin, which is guided along the guide slot, through one side and an open end at the other side, in which when the step is folded or unfolded, the rack gear may slide to the open end of the cover to be stored in or protrude from the cover.

The cover may be coupled to a portion where the rack gear extends to the vehicle body. A locking protrusion may be formed inward at an end where the rack gear is coupled, and a locking portion of the rack gear may be locked to the locking protrusion of the cover such that the step is held and supported in an unfolded state, when the rack gear moves to the lowest position.

The guide slot may be formed in an arc shape about the rotational axis of the pinion gear. More specifically, when the step is folded, the guide pin may move to the bottom dead center of the guide slot, and when the step is unfolded, the guide pin may move to the top dead center of the guide slot such that the step is not unfolded over a predetermined angle. The rack gear and the cover may be formed in a linear manner, and the rack gear and the cover may maintain a predetermined angle to the vehicle body, when the step is unfolded.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
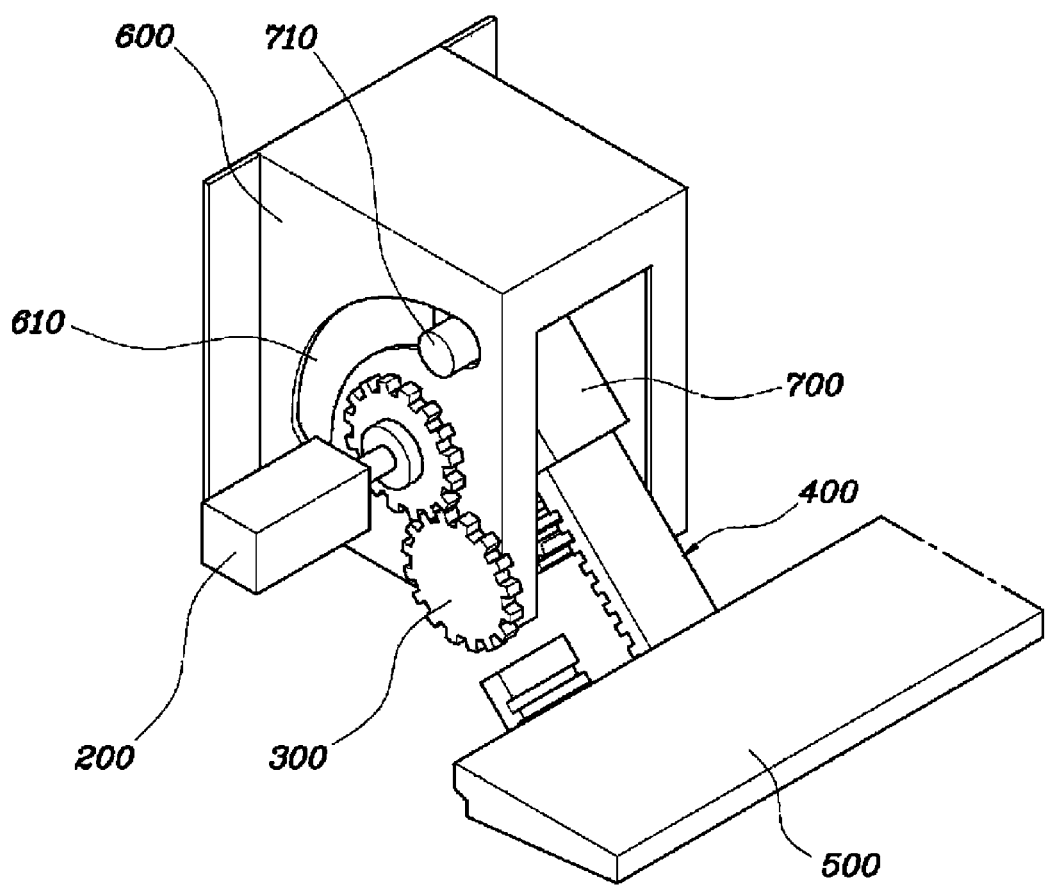
FIG. 1 is a view showing a side-step device according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

A side-step device according to exemplary embodiments of the present invention is described hereafter with reference to the accompanying drawings.

Figure 2:
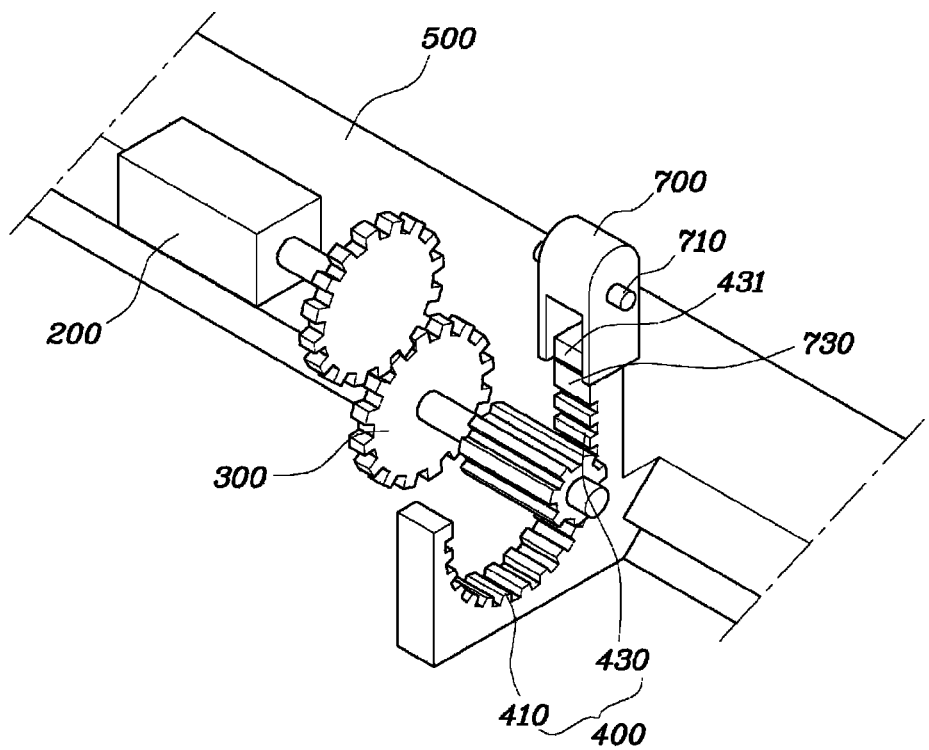
FIG. 2 is a view showing the side-step device in detail.

FIG. 1 is a view showing a side-step device according to an embodiment of the present invention actually mounted on a vehicle and FIG. 2 is a view showing in detail the side-step device of FIG. 1 with a housing 600 removed. The side-step device includes: a driving unit 200 mounted on a vehicle body 100; a pinion gear 300 connected to the driving unit 200 and rotating; a driving gear unit 400 composed of an outer gear 410 surrounding a portion of the pinion gear 300 and engaging with the pinion gear 300 and a rack gear 430 extending from one end of the outer gear 410 to the vehicle body 100; and a step 500 connected to the opposite side of the vehicle body to the driving gear unit 400. The step is folded in a normal state, unfolded out from the vehicle body 100 the pinion gear 300 and the outer gear 410 are interlocked, and extended out from the vehicle body 100 from the unfolded state when the pinion gear 300 and the rack gear 430 are interlocked.

Further, a housing 600 with an arch-shaped guide slot 610 on a side is provided. The driving unit 200 and the pinion gear 300 may be disposed through housing 600 and a cover 700 with a guide pin 710, which is guided along a guide slot 610 of the housing 600, through one side and an open end on the other side.

The cover 700 and the rack gear 430 are coupled to the portion where the rack gear 430 extends to the vehicle body 100, through the open end of the cover 700 and a locking protrusion 730 is formed inward at the end where the cover 700 is coupled to the rack gear 430. Therefore, when the rack gear 430 is unfolded and moved down to the lowest position, a locking portion 431 formed on the rack gear 430 is locked to the locking protrusion 730 of the cover and the step 500 is held and supported in an unfolded state.

Further, when the step 500 is folded or unfolded, the rack gear 430 slides through the open end of the cover 700 to be stored in or protrude from the cover 700, so that the step 500 may form multi-steps, because the rack gear 430 and the cover 700 are formed linearly, and when the step 500 is unfolded, the rack gear 430 and the cover 700 maintains a predetermined angle to the vehicle body 100.

The guide slot 610 is formed in an arc shape centering on the rotational axis of the pinion gear 300, when the step 500 is folded, the guide pin 710 may be coupled to the bottom dead center of the guide slot 610, and when the step 500 is unfolded, the guide pin 710 may be coupled to the top dead center of the guide slot 610 so that the step 500 may not be unfolded over a predetermined angle.

Figure 3:
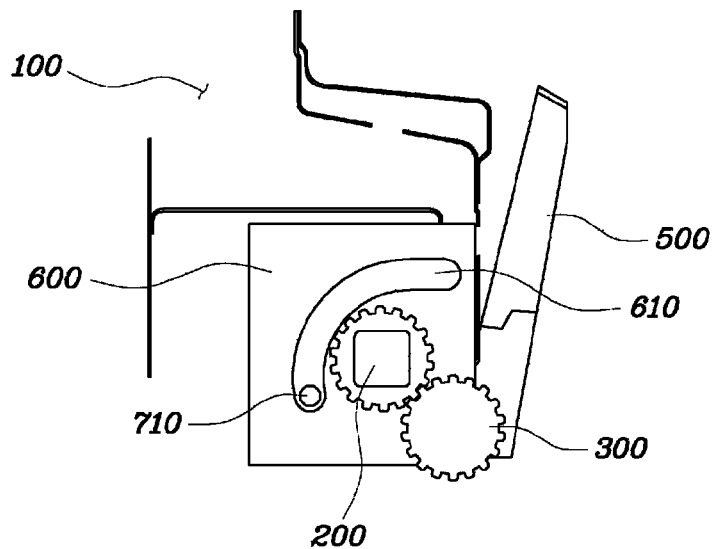
FIG. 3 is a view showing the side-step device that is folded.

Further, the pinion gear 300 interlocks with the outer gear 410 of the driving gear unit 400 in a normal state so that the step 500 may keep folded inside the vehicle body 100. A series of teeth of the outer gear 410 and the rack gear 430 of the driving gear unit 400 are continuously fitted so that the series of teeth may be movably interlocked within the outer gear, thereby when the step 500 is unfolded, the pinion gear 300 rotates within the outer gear 410 first and is moved straight by the rack gear 430 so that the step 500 may slide further down. That is, as in FIG. 3, the step 500 keeps folded inside the vehicle body 100 in a normal state by the engagement of the pinion gear 300 and the outer gear 410 of the driving gear 400.

Figure 4:
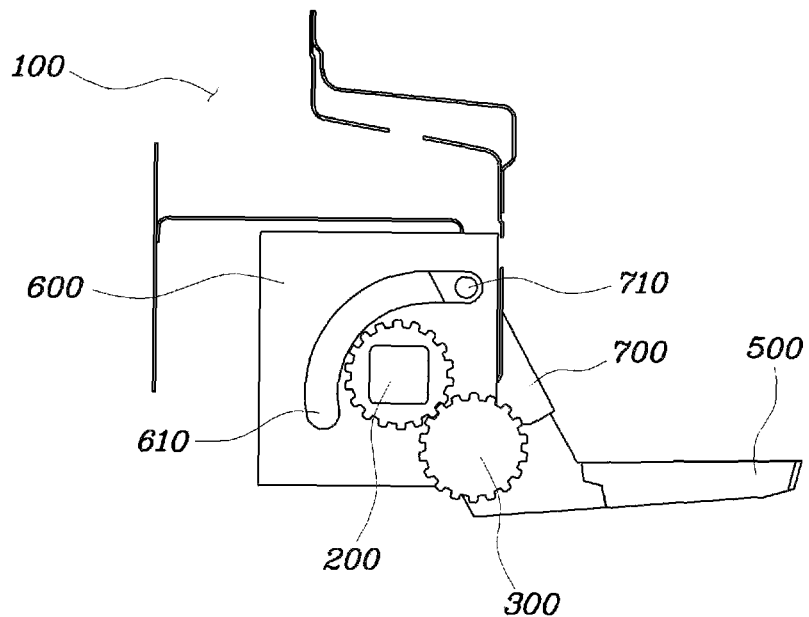
FIG. 4 is a view showing the side-step device that is unfolded.

Thereafter, when a user unfolds the step 500, as in FIG. 4, as the folded step 500 is rotated by the driving unit 200, the pinion gear 300 interconnected through a series of gears with the driving unit 200 engages with the outer gear 410 and rotates the outer gear accordingly, so the guide pin 710 of the cover 700 is guided to slide in the guide slot 610 from the bottom dead center to the top dead center of the guide slot 610. Accordingly, the folded step 500 is unfolded primarily so that a passenger may use it.

Figure 5:
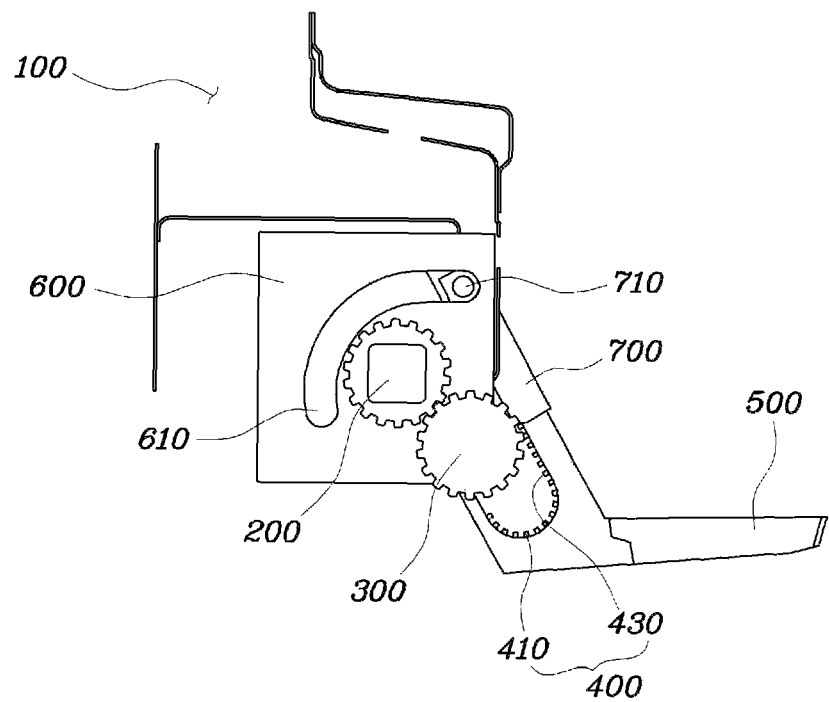
FIG. 5 is a view showing the side-step device that is unfolded and slid.

Furthermore, if the step 500 needs to be further lowered for order, younger or disabled consumers as in FIG. 5, the guide pin 710 is fixed at the top dead center of the housing 600 and supports the cover 700 and the rack gear 430 so that the angle made by the consumer may be maintained, and as the pinion gear 300 moves straight along the rack gear 430, the rack gear 430 slides straight along the open end of the cover 700 to be further exposed and the locking portion 431 of the rack gear 430 is locked to the locking protrusion 730 of the cover 700, so that the step 500 may be supported and held at the lower position than that in FIG. 4.

According to a side-step device of an exemplary embodiment of the present invention, the step that is unfolded and fixed is folded to come in close contact with a vehicle body, unlike the related art, so the design appearance is improved and the aerodynamic performance and fuel efficiency are improved as well, in comparison with the related art which has poor aerodynamic performance during driving due to the step protruding from a side.

Further, the exemplary step of the present invention does not protrude when not in use or while the vehicle is parked and thus, damage to the step, objects or people due to colliding with the step is eliminated, so safety is improved. Also, since the step is doubly supported, the performance as a stepping plate resisting load is improved and the height can be adjusted by the multi-steps, so that the old and the weak may easily use the side-step device.

Further, since the device is folded inside a vehicle body, it can be manufactured with a space and a thickness that is enough for a passenger to step on and while not occupying a large amount of storage space.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A side-step device comprising:
a driving unit mounted on a vehicle body;
a pinion gear connected to the driving unit and configured to rotate;
a driving gear unit composed of an outer gear surrounding a portion of the pinion gear and engaging with the pinion gear and a rack gear extending from one end of the outer gear to the vehicle body; and a step connected to an opposite side of the vehicle body and to the driving gear unit, wherein the step is folded in a normal state, and unfolded out from the vehicle body upon interlocking the pinion gear and the outer gear, and extending out from the vehicle body from the unfolded state upon interlocking the pinion gear and the rack gear, wherein a series of teeth of the outer gear and the rack gear of the driving gear unit are continuously fitted such that the series of teeth maintains a travel path for the pinion gear along the driving gear unit.

2. The device of claim 1, wherein the pinion gear interlocks with the outer gear of the driving gear unit in a normal state so that the step is kept folded inside the vehicle body.

3. The device of claim 1, further comprising a cover having a housing with an arc-shape guide slot on the side, with a guide pin therein, which is guided along the guide slot, through one side and an open end at another side,
wherein when the step is folded or unfolded, the rack gear slides to the open end of the cover to be stored in or protrude from the cover when being used.

4. The device of claim 3, wherein the cover is coupled to the portion where the rack gear extends to the vehicle body, a locking protrusion is formed inward at the end where the rack gear is coupled, and a locking portion of the rack gear is locked to the locking protrusion of the cover such that the step is held and supported in an unfolded state, when the rack gear moves to a lowest position.

5. The device of claim 3, wherein the guide slot is formed in an arc shape about the rotational axis of the pinion gear, when the step is folded, the guide pin moves to a bottom center of the guide slot, and when the step is unfolded, the guide pin moves to the top center of the guide slot such that the step is not unfolded over a predetermined angle.

6. The device of claim 1, wherein the rack gear and the cover are formed linearly, and the rack gear and the cover maintain a predetermined angle to the vehicle body, when the step is unfolded.

7. A side-step device comprising:
a driving unit mounted on a vehicle body;
a pinion gear connected to the driving unit and configured to rotate;
a driving gear unit composed of an outer gear and a rack gear, a portion of the pinion gear positioned to travel within the outer gear and continue from the outer gear along the rack gear, the outer gear and the rack gear moving as one unit due to the travel of the portion of the pinion gear along the outer gear and the rack gear; and
a step connected to an end of the rack gear opposite the outer gear, wherein the step moves toward or away from the vehicle body when the portion of the pinion gear is engaged with the rack gear, and fold or unfolds when the portion of the pinion gear is engaged with the outer gear.

* * * * *